United States Patent
Hay

(10) Patent No.: US 6,813,766 B2
(45) Date of Patent: Nov. 2, 2004

(54) METHOD AND APPARATUS FOR SCHEDULING PROCESSES BASED UPON VIRTUAL SERVER IDENTIFIERS

(75) Inventor: Russell C. Hay, Kirkland, WA (US)

(73) Assignee: Interland, Inc., Minneapolis, MN (US)

( * ) Notice: Subject to any disclaimer, the term of this patent is extended or adjusted under 35 U.S.C. 154(b) by 734 days.

(21) Appl. No.: 09/777,386

(22) Filed: Feb. 5, 2001

(65) Prior Publication Data

US 2002/0107901 A1 Aug. 8, 2002

(51) Int. Cl.[7] .............................. G06F 9/455; G06F 9/46
(52) U.S. Cl. .......................................... 718/1; 718/103
(58) Field of Search ..................................... 718/1–108

(56) References Cited

U.S. PATENT DOCUMENTS 5,361,375 A * 11/1994 Ogi ................................ 718/1
6,091,414 A * 7/2000 Kraft et al. .................. 345/807
6,631,394 B1 * 10/2003 Ronkka et al. .............. 718/100

* cited by examiner

Primary Examiner—Meng-Al T. An
Assistant Examiner—Kenneth Tang
(74) Attorney, Agent, or Firm—Park, Vaughan & Fleming LLP

(57) ABSTRACT

One embodiment of the present invention provides a system that schedules processes within an operating system based upon virtual server identifiers, wherein the operating system supports multiple virtual servers that operate within separate virtual environments on a single computing platform. Upon detecting an event that causes a scheduling priority for a process to be updated, the system looks up a virtual server identifier for the process. This virtual server identifier specifies a virtual server and an associated virtual environment that the process operates within. Next, the system uses the virtual server identifier to look up a scheduling priority associated with the virtual server, and then calculates an updated scheduling priority for the process based upon the scheduling priority for the virtual server.

15 Claims, 6 Drawing Sheets

METHOD AND APPARATUS FOR SCHEDULING PROCESSES BASED UPON VIRTUAL SERVER IDENTIFIERS

RELATED APPLICATION

The subject matter of this application is related to the subject matter in a co-pending non-provisional application by the same inventor as the instant application and filed on the same day as the instant application entitled, "Method and Apparatus for Facilitating Virtual Server Identifiers for Processes," having Ser. No. 09/795,873, and filing date Feb. 28, 2001. The subject matter of this application is also related to the subject matter in a co-pending non-provisional application by the same inventor as the instant application and filed on the same day as the instant application entitled, "Method and Apparatus for Controlling Access to Files Associated With a Virtual Server," having Ser. No. 09/773, 848, and filing date Jan. 31, 2001.

BACKGROUND

1. Field of the Invention

The present invention relates to operating systems for computers. More specifically, the present invention relates to a method and an apparatus for scheduling processes within an operating system based upon virtual server identifiers, wherein the operating system supports multiple virtual servers that operate within separate virtual environments on a single computing platform.

2. Related Art

Application service providers (ASPs) are commonly used to support numerous applications for multiple enterprises, partners and end users. Within an ASP, applications belonging to different enterprises are often run on the same computing platform in order to reduce deployment costs. However, this consolidation can create problems, because processes belonging to one enterprise can potentially access information belonging to another enterprise.

This problem can be remedied by running applications belonging to different enterprises on different "virtual servers" that operate within different "virtual environments" on the same computer system. In this type of system, processes running on a first virtual server in a first virtual environment are insulated from processes running on a second virtual server in a second virtual environment. This means that processes operating within a given virtual environment are only able to access entities or resources defined within the given virtual environment. Hence, from a user's perspective, the given virtual environment appears to be a stand-alone computer system that is dedicated to the given virtual environment.

Existing operating system structures are not well-suited to facilitate virtual servers and virtual environments. The UNIX FREEBSD™ operating system presently supports a chroot( ) command that changes the root directory for a process, and thereby forces the process to run on a subset of the file system, without being able to access any other parts of the file system.

However, existing operating systems presently lack other mechanisms to support virtual environments. For example, there is presently no efficient mechanism to adjust the priority of processes running on a given virtual server relative to the priorities of processes running on other virtual servers. Such a mechanism would allow different virtual servers to provide different levels of service. This would allow processes belonging to a virtual server that provides a higher level of service to run before processes belonging to other virtual servers that provide lower levels of service. At present, such process priorities must be adjusted individually for each process.

What is needed is a method and an apparatus for efficiently adjusting the priority of processes for virtual servers.

SUMMARY

One embodiment of the present invention provides a system that schedules processes within an operating system based upon virtual server identifiers, wherein the operating system supports multiple virtual servers that operate within separate virtual environments on a single computing platform. Upon detecting an event that causes a scheduling priority for a process to be updated, the system looks up a virtual server identifier for the process. This virtual server identifier specifies a virtual server and an associated virtual environment that the process operates within. Next, the system uses the virtual server identifier to look up a scheduling priority associated with the virtual server, and then calculates an updated scheduling priority for the process based upon the scheduling priority for the virtual server.

In one embodiment of the present invention, calculating the updated scheduling priority involves calculating the updated scheduling priority based upon: a value, E, stored within a priority-related timer that keeps track of execution time for the process; a normal system priority, $S_P$, associated with the process; and the scheduling priority, M, associated with the virtual server. In a variation in this embodiment, the system calculates the updated scheduling priority, P, by using the formula $P=S_P+S(E/M)$, wherein S is a tunable constant value.

In one embodiment of the present invention, the system is configured to receive a command to adjust the scheduling priority associated with the virtual server. If this command is received from an authorized entity, the system adjusts the scheduling priority associated with the virtual server so that the scheduling priorities of all processes associated with the virtual server are modified.

In one embodiment of the present invention, the system charges a fee for hosting the virtual server, wherein the fee is based upon the scheduling priority associated with the virtual server.

In one embodiment of the present invention, detecting the event that causes the scheduling priority to be updated involves detecting that the process is entering a sleep state; that the process is waking from a sleep state; or that a priority-related timer associated with the process reaches a maximum value.

In one embodiment of the present invention, looking up the virtual server identifier for the process involves looking up the virtual server identifier within a process structure maintained by the operating system for the process.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
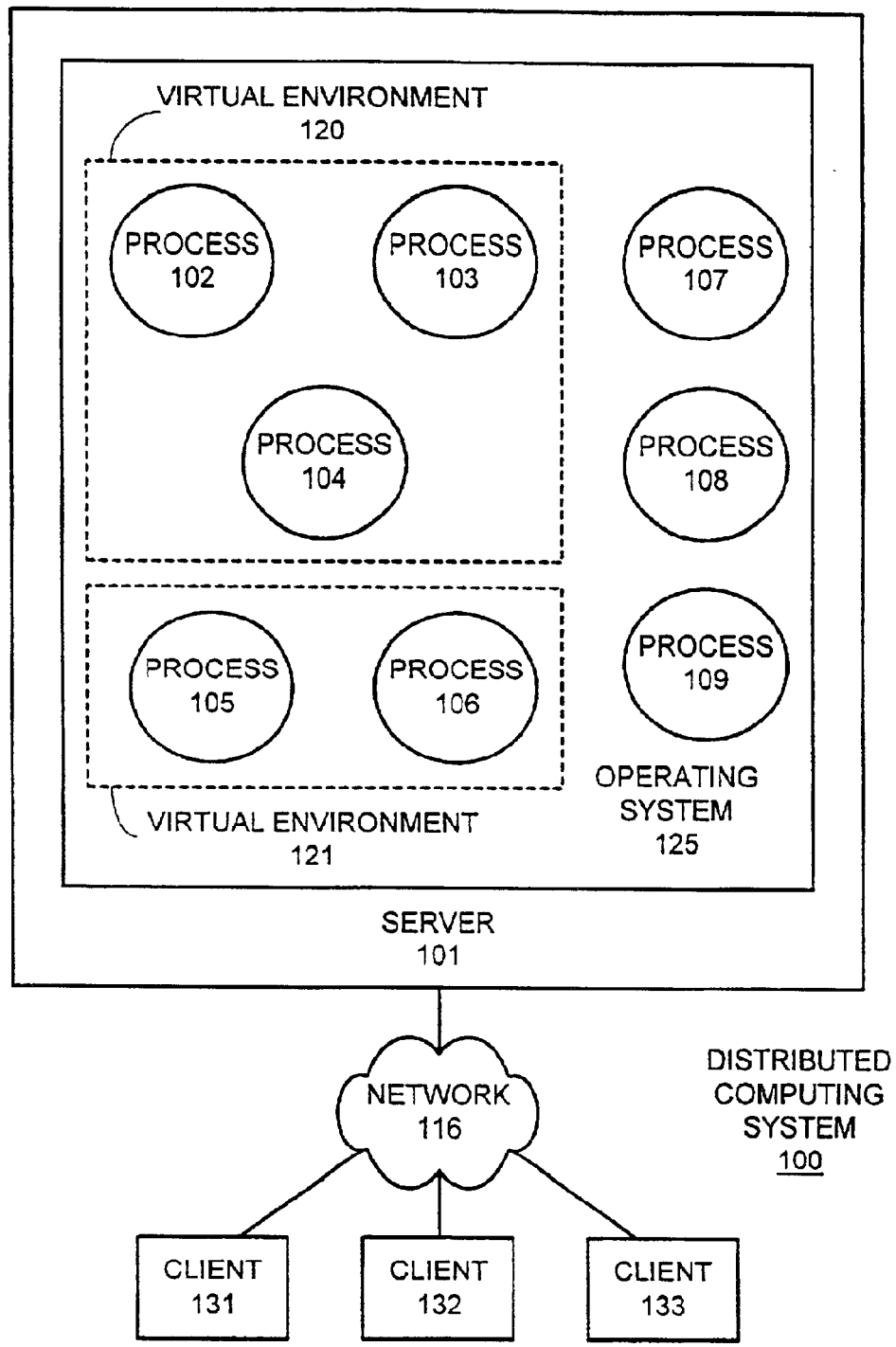
FIG. 1 illustrates a computer system in accordance with an embodiment of the present invention.

FIG. 1 illustrates a distributed computing system 100 in accordance with an embodiment of the present invention. Distributed computing system 100 includes server 101, which is coupled to clients 131–133 through network 130.

Network 130 can generally include any type of wire or wireless communication channel capable of coupling together computing nodes. This includes, but is not limited to, a local area network, a wide area network, or a combination of networks. In one embodiment of the present invention, network 130 includes the Internet.

Clients 131–133 and server 101 are computer systems, which can generally include any type of computer system, including, but not limited to, a computer system based on a microprocessor, a mainframe computer, a digital signal processor, a portable computing device, a personal organizer, a device controller, and a computational engine within an appliance.

More specifically, clients 131–133 can generally include any node on a network including computational capability and including a mechanism for communicating across network 130. Server 101 can generally include any computational node including a mechanism for servicing requests from a client for computational and/or data storage resources.

Server 101 contains an operating system 125, which supports a number of processes 102–109. Some of these processes 102–109 operate inside virtual environments 120–121. In particular, processes 102–104 operate inside virtual environment 120, and processes 105–106 operate inside virtual environment 121. Other processes, such as processes 107–109, do not operate within the confines of a virtual environment.

Note that processes 102–104, which operate inside virtual environment 120, are only able to access entities, such as the other processes, defined within virtual environment 120, and are only able to access resources allocated to virtual environment 120, such as file space and memory space. Similarly, processes 105–106 are only able to access entities or resources defined within virtual environment 121. These restrictions ensure that processes 102–104 are insulted from other resources and from entities within operating system 125 that exist inside other virtual environments, or that exist outside of other virtual environments.

Note each virtual environment 120 and 121 is associated with its own virtual server (not shown). (The terms "virtual server" and "virtual environment" are used somewhat interchangeably throughout this specification.)

Furthermore, note that virtual environments 120–121 can be used to host multiple servers within a single server 101. For example, virtual environment 120 can be used to host a first web site for a first enterprise, while virtual environment 121 can be used to host a second web site for a second enterprise. In this way, the first web site and the second web site can run concurrently on the same underlying server 101, without interfering with each other. Hence, by using the present invention, a single computing device can potentially host hundreds, or even thousands, of virtual environments at the same time.

Also note that each virtual environment 120 and 121 appears to be operating on a separate dedicated computer system, whereas in reality, virtual environments 120 and 121 operate on the same computer system.

Data Structures

Figure 2:
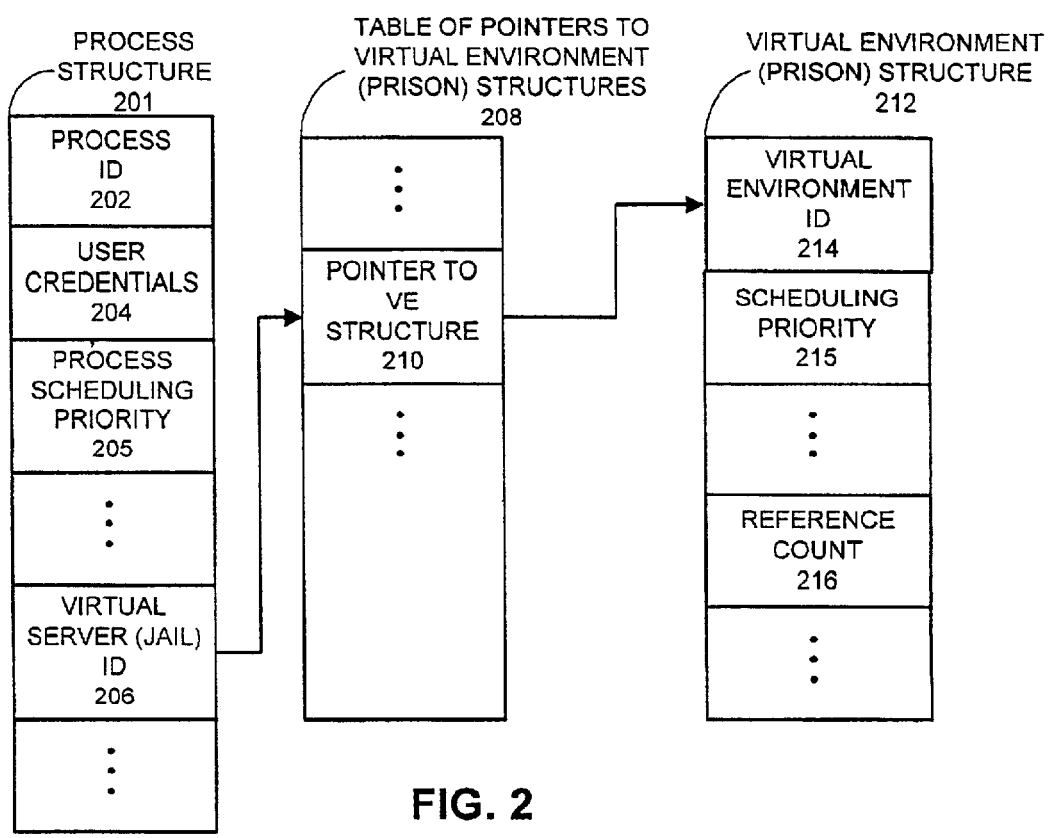
FIG. 2 illustrates data structures involved in facilitating virtual servers and virtual environments in accordance with an embodiment of the present invention.

FIG. 2 illustrates data structures involved in facilitating virtual servers and virtual environments in accordance with an embodiment of the present invention. Each of the processes 102–109 within FIG. 1 has its own process data structure within operating system 125. FIG. 2 illustrates an example process structure 201, which contains a number of items associated within a process, such as process ID 202, which uniquely identifies the process, and user credentials 204 that identify powers of a user of the process. Process structure 201 also includes a process scheduling priority 205 that is used to schedule the process for execution on the underlying computing platform.

In order to facilitate virtual servers, process data structure 201 additionally includes a virtual server ID field 206, which contains an identifier for the virtual server to which the process belongs. If virtual server ID field 206 contains a NULL or invalid value, the associated process does not belong to a virtual server. In one embodiment of the present invention, virtual server ID field 206 contains a "jail ID" that identifies a "jail" defined within the UNIX FreeBSD operating system. Note that no prior operating system provides such a virtual server ID, which is stored within a process structure.

The virtual server ID within field 206 can be used to index a table of pointers to virtual environment structures 208. (Note that a virtual environment is sometimes referred to as a prison.) Each non-NULL entry in table 208 points to a virtual environment structure, such as virtual environment structure 212.

Virtual environment structure 212 generally contains information that defines an associated virtual environment. This can include a virtual environment ID 214, a scheduling priority 215, and a reference count 216. Scheduling priority 215 is a parameter that is used in calculating scheduling priorities for processes operating within the virtual environment. Hence, by adjusting scheduling priority 215, the scheduling priorities for all processes within the virtual environment will be adjusted.

Reference count 216 indicates the number of active processes that are presently operating within an associated virtual environment. Hence, reference count 216 is incremented every time a new process is created within the associated virtual environment, and reference count 216 is decremented every time a process is removed from the associated virtual environment.

Process Initialization

Figure 3:
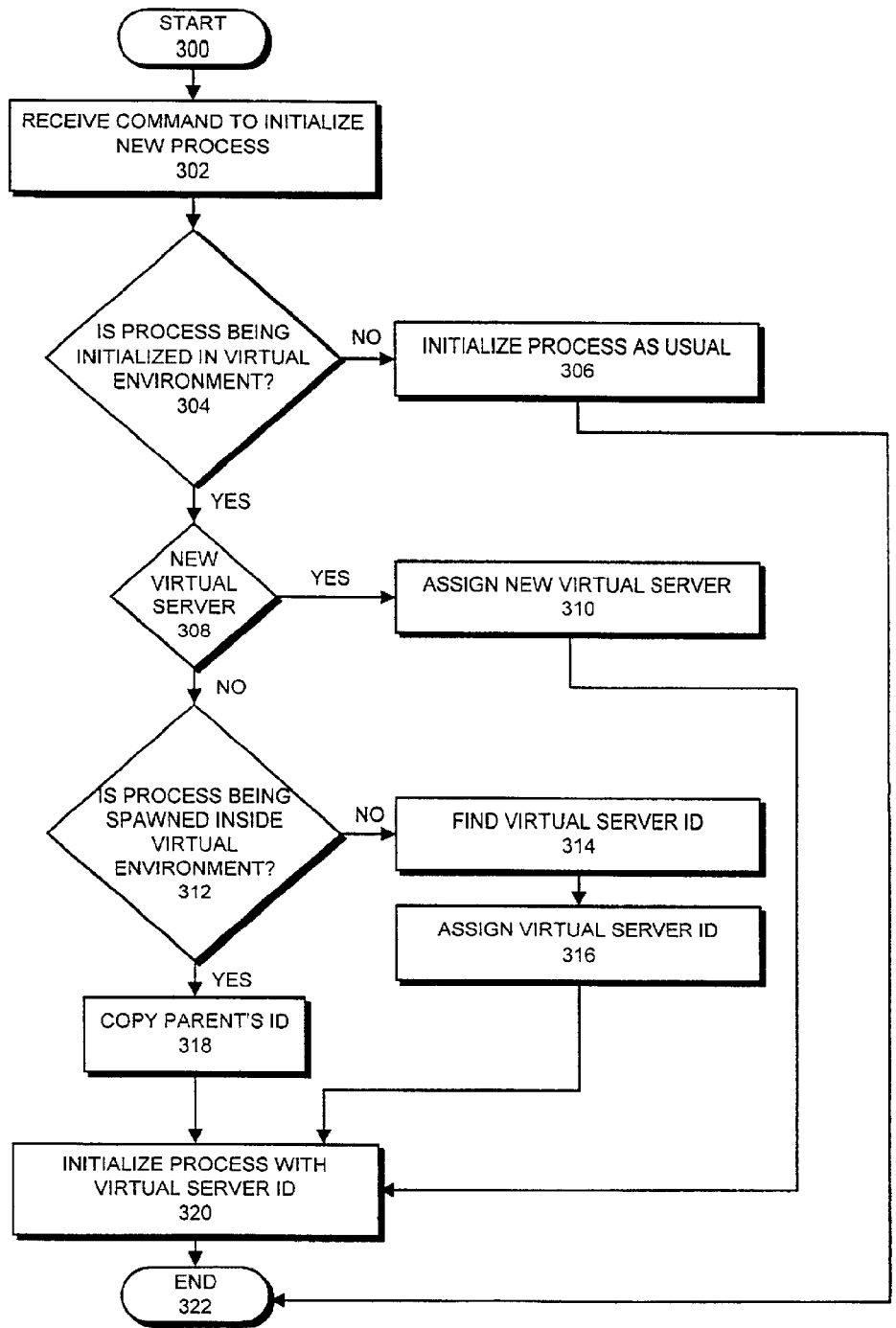
FIG. 3 is a flow chart illustrating the initialization of a process in accordance with an embodiment of the present invention.

FIG. 3 is a flow chart illustrating the initialization of a process in accordance with an embodiment of the present invention. The system starts by receiving a call to an operating system function to initialize a process (box 302). The system first determines if the process is being initialized within a virtual environment (box 304). In embodiment of the present invention, this involves examining an argument to the process initialization function to see if a virtual environment is identified. If the process is not being initialized within a virtual environment, the system initializes the process as usual (box 306).

Otherwise, if the process is being initialized within a virtual environment, the system determines whether the associated virtual server is a new virtual server (box 308). This may involve scanning through table 208 in FIG. 2 looking for the virtual server. If the virtual server is a new virtual server, the system assigns a new virtual server identifier to the process (box 310), and then initializes the process with the virtual server ID (box 320). In one embodiment of the present invention, this involves copying the virtual server ID into field 206 within process data structure 201 in FIG. 2.

If at box 308 the virtual server is not a new virtual server, the system determines if the process is being spawned inside a virtual environment (box 312). If so, the system copies a virtual server identifier from a parent process (box 318) in order to initialize the process (box 320).

If at box 312 the process is not being spawned within a virtual environment, the system finds the virtual server ID (box 314). In one embodiment of the present invention, this involves performing a lookup, based upon factors such as an Internet Protocol (IP) address of the virtual server, to find the virtual server ID. Next, the system assigns the virtual server ID to the process (box 316), and then initializes the process (box 320).

Use of Virtual Server Identifier

Figure 4:
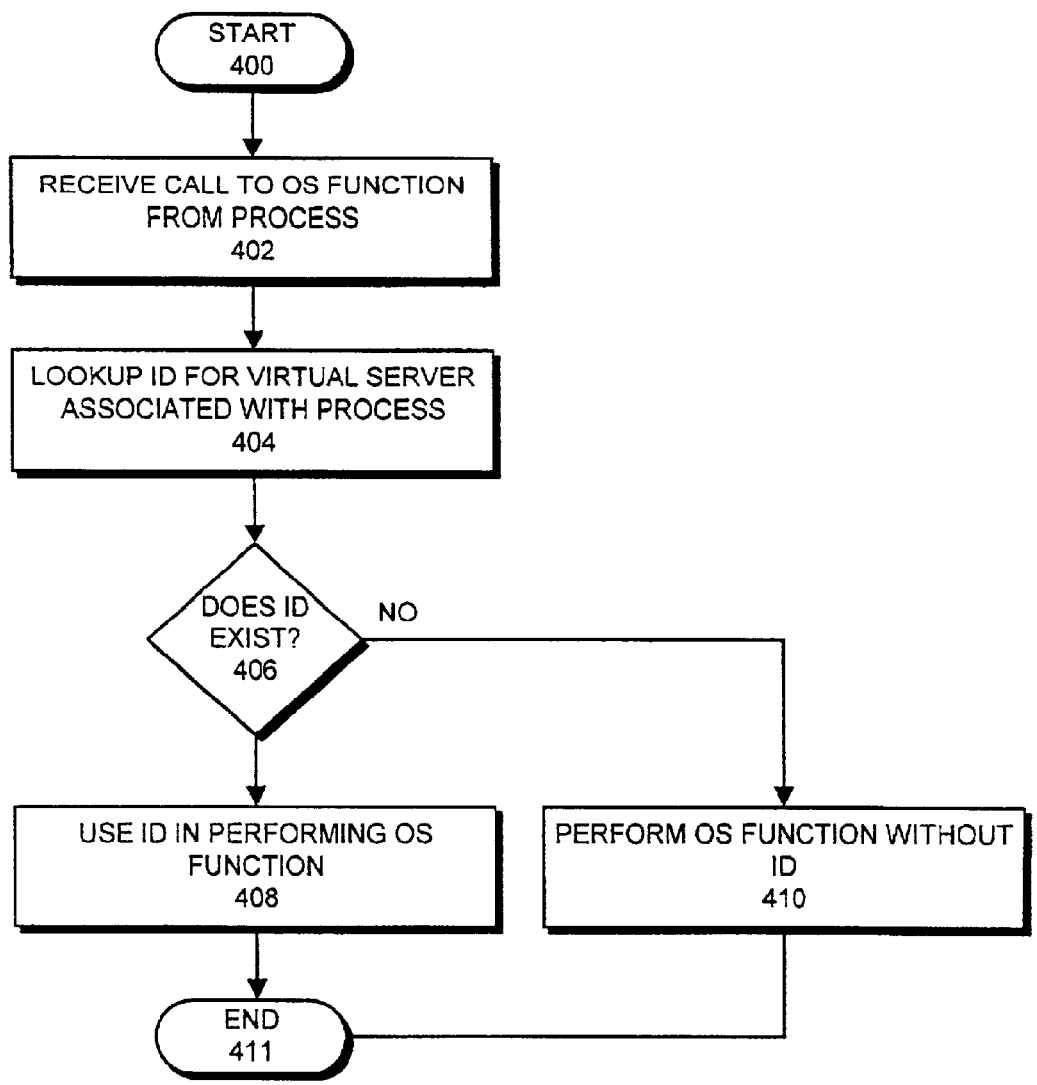
FIG. 4 is a flow chart illustrating the use of a virtual server identifier within a system call in accordance with an embodiment of the present invention.

FIG. 4 is a flow chart illustrating the use of a virtual server identifier within a system call in accordance with an embodiment of the present invention. The system starts by receiving an operating system call from a process (box 402). Next, the system looks up an identifier for a virtual server associated with the process (box 404). This may involve examining field 206 within process data structure 201 in FIG. 2. If a virtual server identifier exists, the system uses the virtual server identifier in performing the operating system function (box 408). Otherwise, the system performs the operating system function without using the virtual server identifier (box 410). For example, a process kill function with a virtual server identifier can only kill processes within an associated virtual environment, whereas a process kill function without a virtual server identifier can potentially kill any process within the operating system.

Process Run Queues

Figure 5:
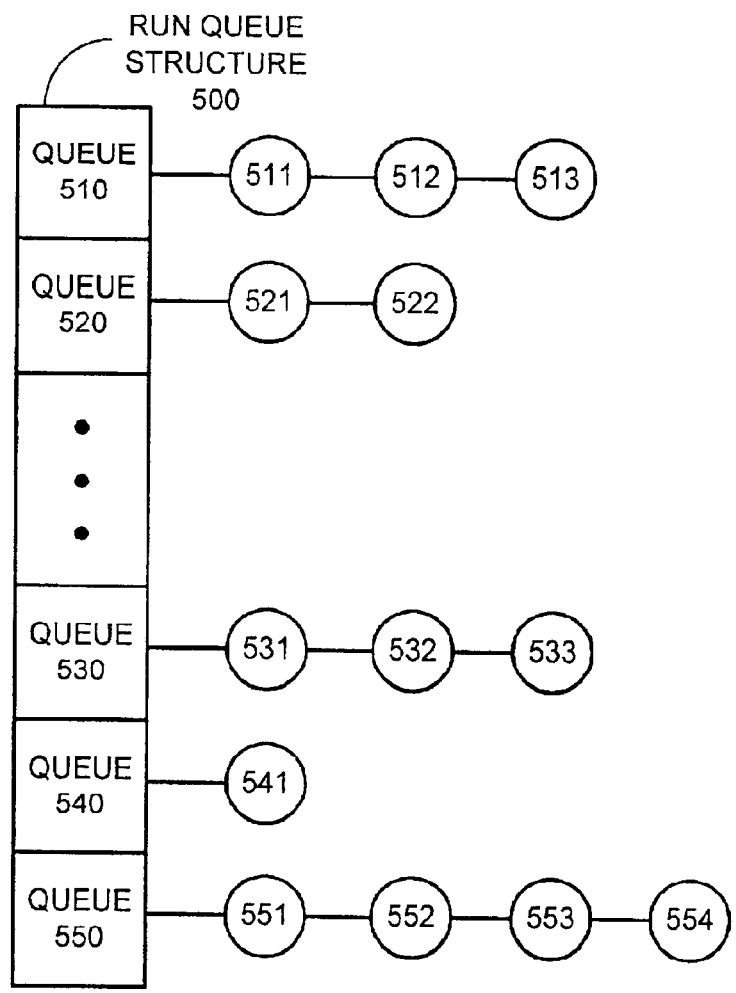
FIG. 5 illustrates multiple run queues with different priorities in accordance with an embodiment of the present invention.

FIG. 5 illustrates multiple run queues with different priorities in accordance with an embodiment of the present invention. As illustrated in FIG. 5, a run queue structure 500 contains a number of run queues 510, 520, 530, 540 and 550, each of which may contain processes to be executed. More specifically, run queue 510 contains processes 511–513, run queue 520 contains processes 521–522, run queue 530 contains processes 531–533, run queue 540 contains process 541, and run queue 550 contains processes 551–554, Each run queue has a different priority so that processes in higher priority run queues can execute before processes in lower priority run queues. For example, run queue 510 has a higher priority than run queue 520, which has a higher priority than run queue 530, which has a higher priority than run queue 540, which has a higher priority than run queue 550.

As a given process executes, its priority decreases. For example, after process 511 executes in queue 510 it will move to lower-priority run queue 520. Conversely, as the given process waits to execute, its priority increases. There is also a limit on the number of processes. All of these properties taken together ensure that the given process will not get locked out of executing by other processes with higher priorities.

Calculating an Updated Priority

Figure 6:
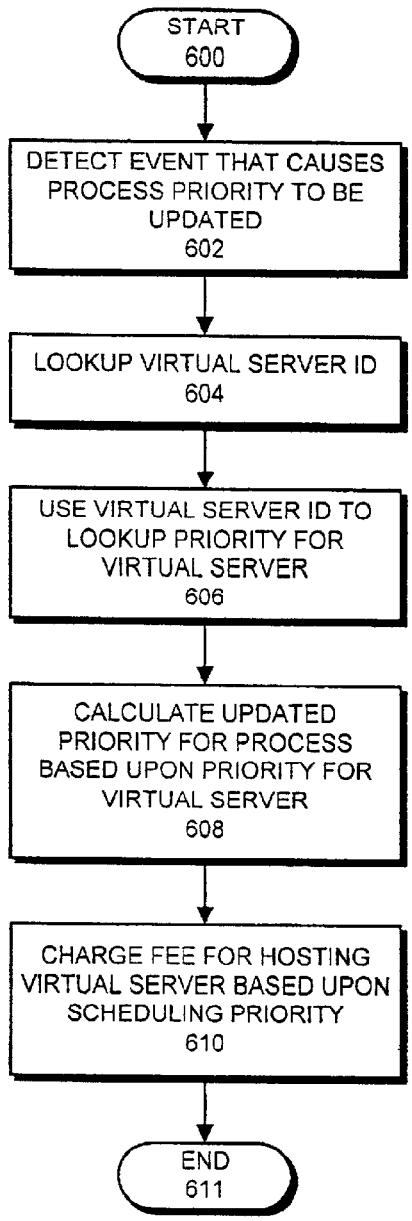
FIG. 6 is a flow chart illustrating the process of calculating an updated priority for a process in accordance with an embodiment of the present invention.

FIG. 6 is a flow chart illustrating the process of calculating an updated priority for a process in accordance with an embodiment of the present invention. The system first detects an event that causes the priority for a given process to be updated (box 602). This event may generally include any event that can cause a processes priority to be updated, including: the process entering a sleep state; the process waking from a sleep state; or a priority-related timer associated with the process reaching a maximum value.

Next, the system looks up virtual server ID 206 for the process within process structure 201 in FIG. 2 (box 604). The system then uses virtual server ID 206 to look up a priority for the virtual server (box 606). In one embodiment of the present invention, this involves looking up scheduling priority field 215 within virtual environment structure 212 in FIG. 2.

The system then calculates an updated scheduling priority for the process based upon the priority for the virtual server (box 608). In one embodiment of the present invention, calculating the updated scheduling priority involves calculating the updated scheduling priority based upon: a value, E, stored within a priority-related timer that keeps track of execution time for the process; a normal system priority, $S_P$, associated with the process; and the scheduling priority, M, associated with the virtual server. In one embodiment of the present invention, the system calculates this updated scheduling priority, P, by using the formula $P=S_P+S(E/M)$, wherein S is a tunable constant value.

The system may also charge a fee for hosting a specific virtual server based in part upon the scheduling priority provided to the virtual server (box 610). In this way, the system can charge more for hosting a virtual server with a higher priority, and can charge less for hosting a virtual server within a lower priority.

Adjusting a Process Priority for a Virtual Server

Figure 7:
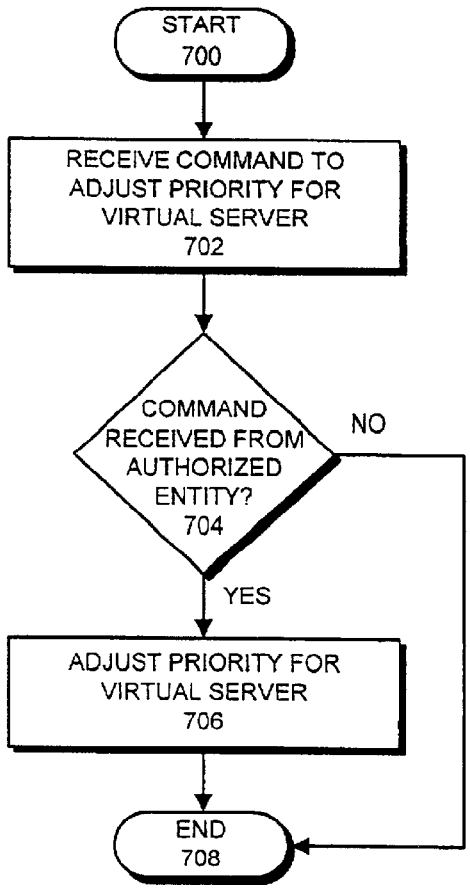
FIG. 7 is a flow chart illustrating the process of adjusting a process priority associated with a virtual server in accordance with an embodiment of the present invention.

FIG. 7 is a flow chart illustrating the process of adjusting a process priority associated with a virtual server in accordance with an embodiment of the present invention. The system first receives a command to adjust the process priority for the virtual server (box 702). Next, the system determines whether the command was received from an entity, such as a system administrator, who is authorized to adjust the process priority for the virtual server (box 704). If so, the system performs the requested adjustment (box 706). This may involve adjusting the value in the scheduling priority field 215 in virtual environment structure 212 in FIG. 2. If the command is not received from an authorized entity, the system does not adjust the priority.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for scheduling processes within an operating system based upon virtual server identifiers, wherein the operating system supports multiple virtual servers that operate within separate virtual environments on a single computing platform, the method comprising:

the operating system detecting an event that causes a scheduling priority for a process to be updated;

the operating system looking up a virtual server identifier for the process, wherein the virtual server identifier specifies a virtual server and an associated virtual environment that the process operates within;

the operating system using the virtual server identifier to look up a scheduling priority associated with the virtual server; and the operating system calculating an updated scheduling priority for the process based upon the scheduling priority associated with the virtual server;

wherein calculating the updated scheduling priority involves calculating the updated scheduling priority based upon:

a value, E, stored within a priority-related timer that keeps track of execution time for the process, a system priority, $S_P$, associated with the process, and the scheduling priority, M, associated with the virtual server; and wherein calculating the updated scheduling priority, P, involves calculating $P=S_P+S(E/M)$, wherein S is a tunable constant value.

2. The method of claim 1, wherein the method further comprises:

receiving a command to adjust the scheduling priority associated with the virtual server;

if the command is received from an authorized entity, adjusting the scheduling priority associated with the virtual server so that the scheduling priorities of all processes associated with the virtual server are modified.

3. The method of claim 1, wherein the method further comprises charging a fee for hosting the virtual server, wherein the fee is based upon the scheduling priority associated with the virtual server.

4. The method of claim 1, wherein detecting the event that causes the scheduling priority for the process to be updated involves detecting one of:

the process entering a sleep state;

the process waking up from the sleep state; and a priority-related timer associated with the process reaching a maximum value.

5. The method of claim 1, wherein looking up the virtual server identifier for the process involves looking up the virtual server identifier within a process structure maintained by the operating system for the process.

6. A computer-readable storage medium storing instructions that when executed by a computer cause the computer to perform a method for scheduling processes within an operating system based upon virtual server identifiers, wherein the operating system supports multiple virtual servers that operate within separate virtual environments on a single computing platform, the method comprising:

the operating system detecting an event that causes a scheduling priority for a process to be updated;

the operating system looking up a virtual server identifier for the process, wherein the virtual server identifier specifies a virtual server and an associated virtual environment that the process operates within;

the operating system using the virtual server identifier to look up a scheduling priority associated with the virtual server; and the operating system calculating an updated scheduling priority for the process based upon the scheduling priority associated with the virtual server;

wherein calculating the updated scheduling priority involves calculating the updated scheduling priority based upon:

a value, E, stored within a priority-related timer that keeps track of execution time for the process, a system priority, $S_P$, associated with the process, and the scheduling priority, M, associated with the virtual server; and wherein calculating the updated scheduling priority, P, involves calculating $P=S_P+S(E/M)$, wherein S is a tunable constant value.

7. The computer-readable storage medium of claim 6, wherein the method further comprises:

receiving a command to adjust the scheduling priority associated with the virtual server;

if the command is received from an authorized entity, adjusting the scheduling priority associated with the virtual server so that the scheduling priorities of all processes associated with the virtual server are modified.

8. The computer-readable storage medium of claim 6, wherein the method further comprises charging a fee for hosting the virtual server, wherein the fee is based upon the scheduling priority associated with the virtual server.

9. The computer-readable storage medium of claim 6, wherein detecting the event that causes the scheduling priority for the process to be updated involves detecting one of:

the process entering a sleep state;

the process waking up from the sleep state; and a priority-related timer associated with the process reaching a maximum value.

10. The computer-readable storage medium of claim 6, wherein looking up the virtual server identifier for the process involves looking up the virtual server identifier within a process structure maintained by the operating system for the process.

11. An apparatus that schedules processes within an operating system based upon virtual server identifiers, wherein the operating system supports multiple virtual servers that operate within separate virtual environments on a single computing platform, the apparatus comprising:

a detection mechanism in the operating system that is configured to detect an event that causes a scheduling priority for a process to be updated;

a lookup mechanism in the operating system that is configured to look up a virtual server identifier for the process, wherein the virtual server identifier specifies a virtual server and an associated virtual environment that the process operates within;

wherein the lookup mechanism is additionally configured to use the virtual server identifier to look up a scheduling priority associated with the virtual server; and a calculating mechanism in the operating system that is configured to calculate an updated scheduling priority for the process based upon the scheduling priority associated with the virtual server;

wherein the calculating mechanism is configured to calculate the updated scheduling priority based upon:
   a value, E, stored within a priority-related timer that keeps track of execution time for the process,
   a system priority, $S_P$, associated with the process, and
   the scheduling priority, M, associated with the virtual server; and wherein the calculating mechanism is configured to calculate the updated scheduling priority, P, by calculating $P=S_P+S(E/M)$, wherein S is a tunable constant value.

12. The apparatus of claim 11, further comprising a priority adjustment mechanism that is configured to:
   receive a command to adjust the scheduling priority associated with the virtual server; and to
   adjust the scheduling priority associated with the virtual server so that the scheduling priorities of all processes associated with the virtual server are modified, if the command is received from an authorized entity.

13. The apparatus of claim 11, further comprising a fee calculation mechanism that is configured to calculate a fee for hosting the virtual server based upon the scheduling priority associated with the virtual server.

14. The apparatus of claim 11, wherein the detection mechanism is configured to detect one of:
   the process entering a sleep state;
   the process waking up from the sleep state; and
   a priority-related timer associated with the process reaching a maximum value.

15. The apparatus of claim 11, wherein the lookup mechanism is configured to look up the virtual server identifier for the process by looking up the virtual server identifier within a process structure maintained by the operating system for the process.

* * * * *